United States Patent [19]

Lee

[11] Patent Number: 5,700,025
[45] Date of Patent: Dec. 23, 1997

[54] VEHICLE SUSPENSION SYSTEM FOR A STEERABLE WHEEL

[75] Inventor: Un Koo Lee, Kyungki-do, Rep. of Korea

[73] Assignee: Hyundai Motor Company, Seoul, Rep. of Korea

[21] Appl. No.: 750,376

[22] PCT Filed: May 22, 1995

[86] PCT No.: PCT/KR95/00062

§ 371 Date: Dec. 6, 1996

§ 102(e) Date: Dec. 6, 1996

[87] PCT Pub. No.: WO96/37375

PCT Pub. Date: Nov. 28, 1996

[51] Int. Cl.$^6$ .................................................. B62D 17/00
[52] U.S. Cl. ...................... 280/661; 280/96.1; 280/675
[58] Field of Search .............................. 280/661, 96.1, 280/660, 675, 691, 690, 94

[56] References Cited

U.S. PATENT DOCUMENTS

| | | | |
|---|---|---|---|
| 4,973,075 | 11/1990 | Rori et al. | 280/661 |
| 5,094,472 | 3/1992 | Oyama et al. | 280/661 |
| 5,292,149 | 3/1994 | Luger | 280/661 |
| 5,620,199 | 4/1997 | Lee | 280/691 |

FOREIGN PATENT DOCUMENTS

| | | | |
|---|---|---|---|
| 0269705 | 11/1988 | Japan | 280/661 |
| 0032912 | 2/1989 | Japan | 280/661 |

*Primary Examiner*—Christopher P. Ellis
*Attorney, Agent, or Firm*—Birch, Stewart, Kolasch & Birch, LLP

[57] ABSTRACT

The suspension system for a vehicle includes a wheel carrier for supporting a wheel. There is a camber regulating device and a caster regulating device. These regulating devices are disposed on a car body side end of a control arm. There is also a co-regulating device, which is connected to the wheel carrier. Sensors sense the driving state of the vehicle and an electronic control unit receives a signal from the sensor for controlling the camber, caster and toe regulating devices.

5 Claims, 7 Drawing Sheets

VEHICLE SUSPENSION SYSTEM FOR A STEERABLE WHEEL

BACKGROUND OF THE INVENTION

1. Field of the Invention

The present invention relates to a vehicle suspension system for a steerable wheel and, more particularly, to a vehicle suspension system for a steerable wheel which correctly changes the camber, the caster and toe according to the driving condition to which the vehicle is subjected to.

2. Description of Conventional Art

In general, a vehicle suspension system for a steerable wheel connects a shaft and a frame to each other, and absorbs vibrations and impacts from a road surface while the vehicle is running, thereby improving ride comfort and stability of the vehicle.

To absorb impacts from a road surface, a vehicle suspension system for a steerable wheel should be connected flexibly in a vertical direction, and to endure driving force, braking force and centrifugal force during the vehicle's turning operation applied to a wheel, a vehicle suspension system for a vehicle should be connected firmly in a horizontal direction.

A vehicle suspension system can be classified as an axle integral suspension system and an independent suspension system. While an axle integral suspension system is applied to a large vehicle, for example, buses, trucks and rear axles of passenger cars, an independent suspension system is applied mainly to an axle of a passenger car. To improve ride comfort and stability, an independent suspension system is bisected to act independently.

The present invention relates to an independent suspension system. As a vehicle suspension system for a steerable wheel, an independent suspension system of Macpherson type and that of Wishbone type are applied widely. The axle is thereby prevented from directly transmitting an impact or vibration from a road surface to the vehicle body, so that optimal handling stability and running stability can be obtained.

A vehicle suspension system for a steerable wheel is designed to maintain a proper position of a vehicle in a vehicle operation as well as absorb vibrations or impacts transmitted from a road surface to the vehicle body thereby ensuring running stability and handling stability.

In FIG. 9 of the drawings, a vehicle suspension system for a steerable wheel of prior art comprises a wheel carrier 100 rotatably supporting a wheel, an upper control arm 102 and a lower control arm 104 connecting the upper and lower portion of the wheel carrier 100 with a car body and a spring assembling body 108 having a shock absorber 106.

But, in this suspension system, elements (camber, caster and toe) of the wheel alignment are fixed as to predetermined values.

Accordingly, the wheel alignment is fixed in an optimal value for only one driving state, this suspension system cannot correspond to another driving state that the wheel receives different load and impact, so that it has a blind point with respect to ride comfort, stability and so on.

SUMMARY OF THE INVENTION

The objects of the present invention provides a vehicle suspension system for a steerable wheel which properly changes camber, caster and toe according to the driving condition of the vehicle, thereby improving ride quality and steerability to solve the above problems.

The objects of the present invention are fulfilled by providing a vehicle suspension system for a steerable wheel comprising:

a wheel carrier rotatably supporting a wheel;

a camber regulating means which is disposed on car body side ends of the control arm and pushes or pulls the control arm to a wheel side thereby regulating a camber angle;

a caster regulating means which is disposed on the car body side ends of the control arm and moves the control arm to the front and the rear of a vehicle thereby regulating a caster angle;

a toe regulating means which is connected with the wheel carrier thereby regulating a toe;

sensors sensing a driving state of the vehicle; and an electronic control unit 3 receiving signals from the sensors and controlling the camber regulating means, the caster regulating means and the toe regulating means.

Further, the present invention provides the vehicle suspension system for the steerable wheel, wherein the camber regulating means includes:

a fixed rod rotatably connected with the car body side ends of the control arm;

a hinged plate which is rotatably connected with both side ends of the fixed rods and is hinged on the car body;

an actuator which is rotatably connected with the fixed rod and moves the fixed rod in the direction of car width; and a direction converting valve controlling the flowing direction of pressurized fluid supplied to the actuator.

Further, the present invention provides the vehicle suspension system for the steerable wheel, wherein the caster regulating means includes:

a fixed rod rotatably connected with the car body side ends of the control arm;

mail screw portions provided on both ends of the fixed rod;

a worm gear fixed on one side end of the fixed rod;

a worm for rotating the worm gear;

a ball-screw which is fixed to the hinged plate, in which the male screw portion is inserted thereby making the fixed rod to rotate and move in front and rear direction of the vehicle; and a driving means for rotating the worm.

Further, the present invention provides the vehicle suspension system for the steerable wheel, wherein the toe regulating means includes:

a connecting link connected with the wheel carrier;

a pivot member which is hinged on the car body and is connected with the connecting link;

an actuator rotating the pivot member; and a direction converting valve controlling the flowing direction of pressurized fluid supplied to the actuator.

Further, the present invention provides the vehicle suspension system for the steerable wheel, wherein the fixed rod includes a first fixed rod rotatably connected with car body side ends of the control arm and a second fixed rod rotatably connected with the actuator.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
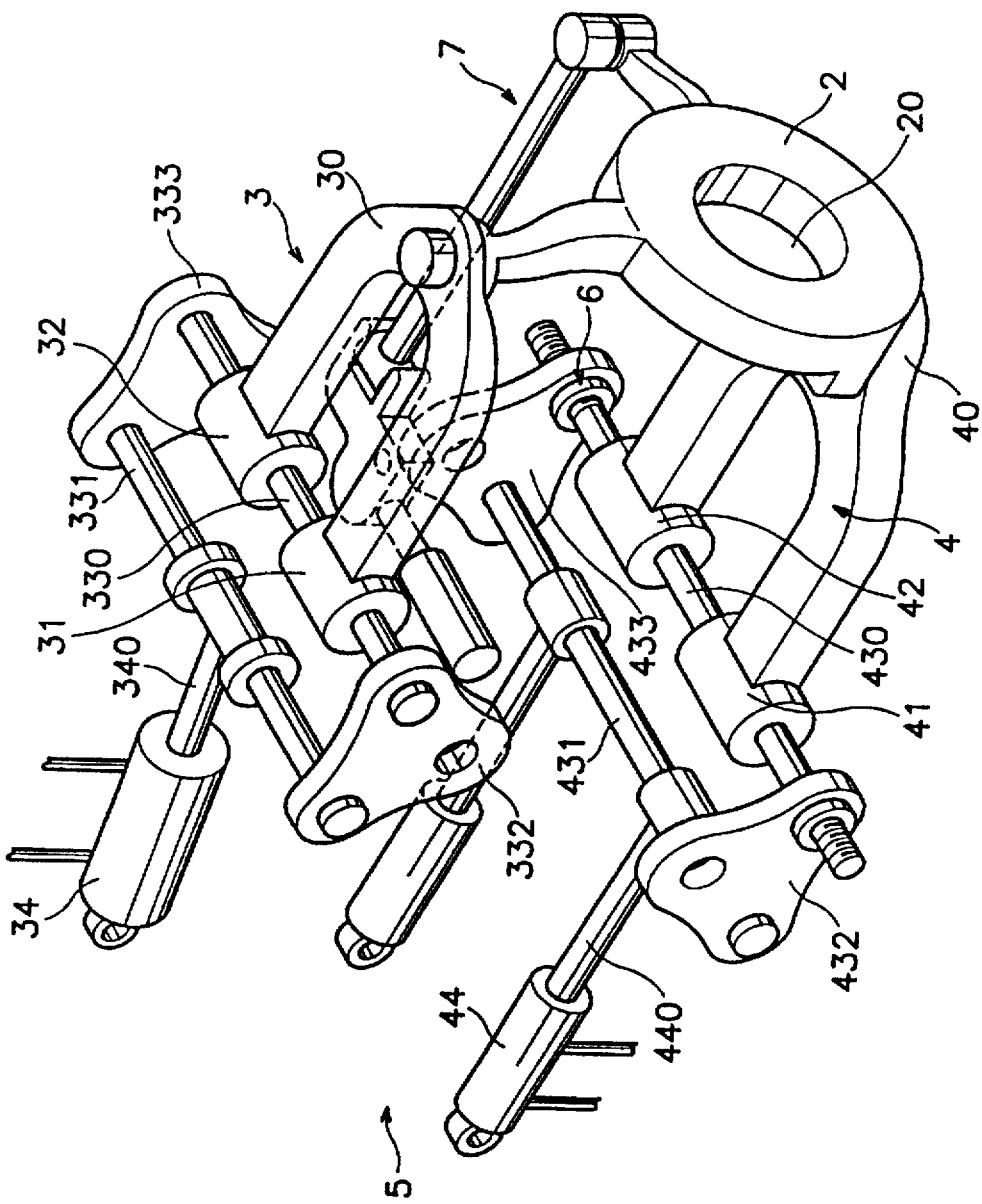
FIG. 1 is a perspective view of an embodiment of a suspension system according to the invention.

The following is the description of the preferred embodiments according to the present invention. In the drawings, like numerals have been used to identify like elements in each figure.

In FIG. 1, a suspension system according to the present invention that includes a wheel carrier 2 rotatably supporting a wheel (not shown), upper and lower control arms 3 and 4 connecting upper and lower portions of the wheel carrier 2 with a car body, camber and caster regulating means 5 and 6 which are disposed on ends of the car body side of the upper and lower control arms 3 and 4 thereby regulating a camber and a caster respectively and a toe regulating means 7 connected to the wheel carrier 2 thereby regulating a toe.

A hollow hole 20 is formed on a central portion of the wheel carrier 2 and a driving shaft (not shown) passes therethrough and the wheel is disposed on ends of the driving shaft. Further, the upper and lower control arms 3 and 4, of which connecting portions 30 and 40 of wheel side ends are connected with the wheel carrier 2 by a ball joint, and of which connecting portions 31 and 32, and 41 and 42 of car body side ends are connected with the car body, so that it is possible that the wheels rise and fall according to a state of a road surface and a driving condition.

The camber regulating means 5 includes the upper and lower control arms 3 and 4 rotatably connected with the wheel carrier 2 respectively in the vertical direction of the car body, hinged plates 332, 333, 432 and 433 hinged on the car body, first fixed rods 330 and 430 which are rotatably inserted into the connecting portions 31 and 32, and 41 and 42 of the car body side ends of the control arms 3 and 4 respectively and are rotatably connected with the hinged plates 332 and 333, and 432 and 433 respectively, second fixed rods 331 and 431 rotatably connected with the hinged plates 332 and 333, and 432 and 433 and actuators 34 and 44 having piston rods 340 and 440 rotatably connected with the second fixed rods 331 and 431 respectively.

Figure 3:
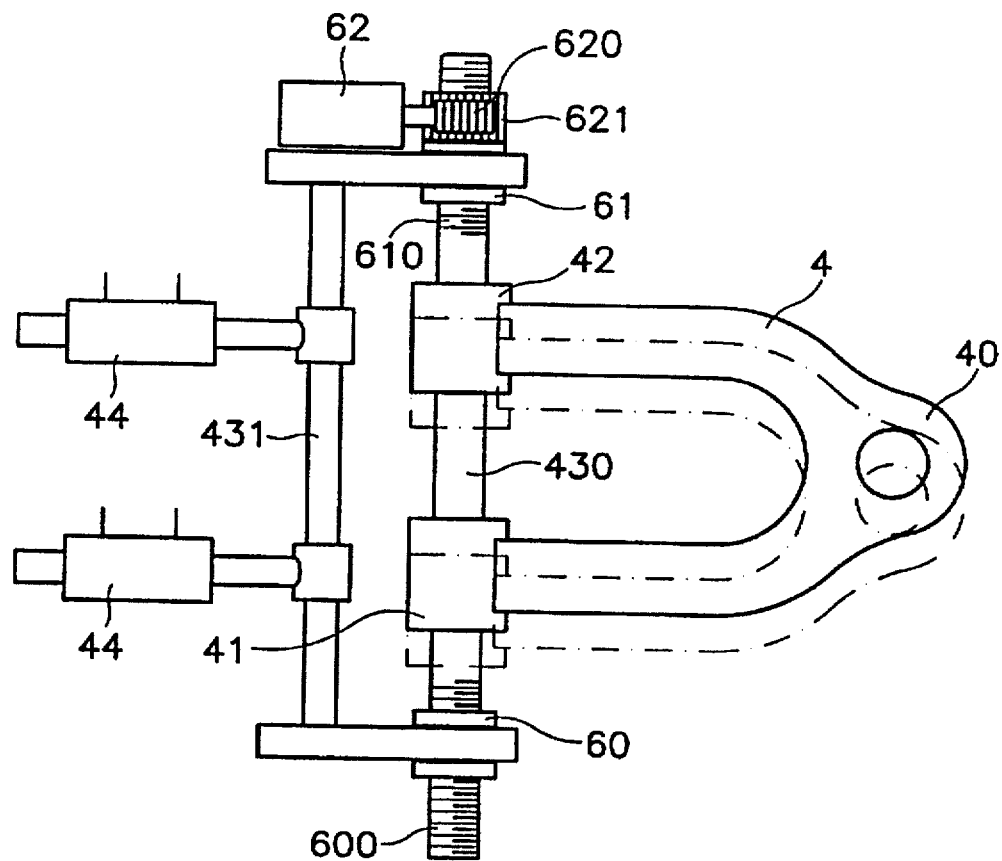
FIG. 3 is a schematic view of a caster regulating means applied to an embodiment of a suspension system according to the present invention.

With reference to FIG. 1 and FIG. 3 together, the caster regulating means 6 includes the lower control arm 4, the first fixed rod 430 connected with the lower control arm 4 to be rotated but not to be linearly moved with respect to the lower control arm 4, male screw portions 600 and 610 formed on both side ends of the first fixed rods 430, lower hinged plates 432 and 433, ball screws 60 and 61 which are mounted on the hinged plates 432 and 433 and are combined with the male screw portions 600 and 610 thereby making the first fixed rod 430 to rotate and move, a worm gear 621 fixed on the male screw portion 610, a direct current motor 62 disposed on one surface of the hinged plate 433 and a worm 620 which is disposed on an end of the shaft of the direct current motor and rotates the worm gear.

Figure 5:
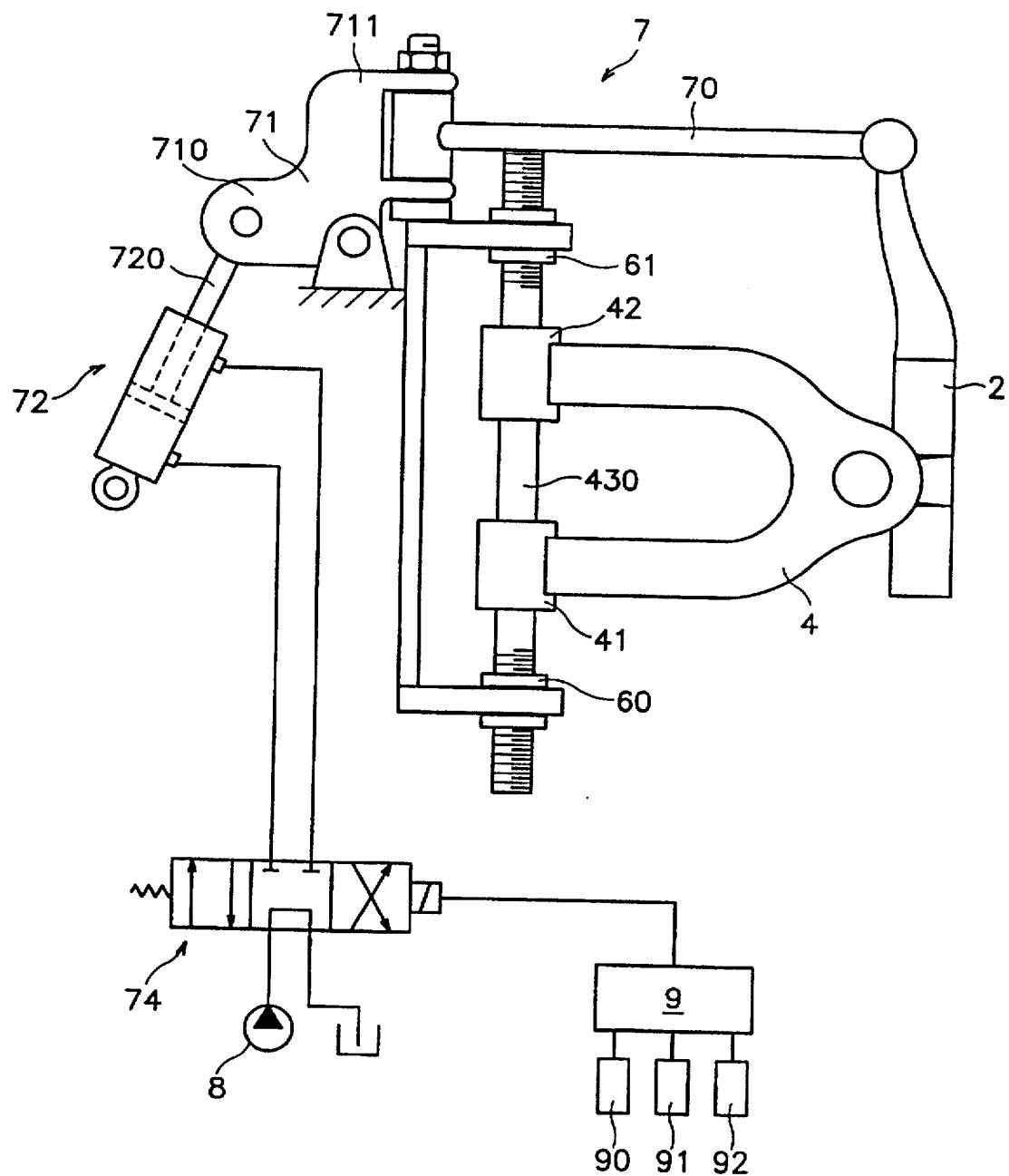
FIG. 5 is a schematic view of a toe regulating means applied to an embodiment of a suspension system according to the present invention.

With reference to FIG. 5, the toe regulating means 7 includes a connecting link 70 of which one side end is connected with the wheel carrier 2 by a ball joint, a pivot member 71 having a horizontal portion 710 and a vertical portion 711 and an actuator 72, wherein the connecting link 70 is rotatably connected with the vertical potion 711 in the vertical direction of the car body and the piston rod 720 of the actuator 72 is rotatably connected with the horizontal portion 710.

The following is the description of the camber regulating means 5.

Figure 2:
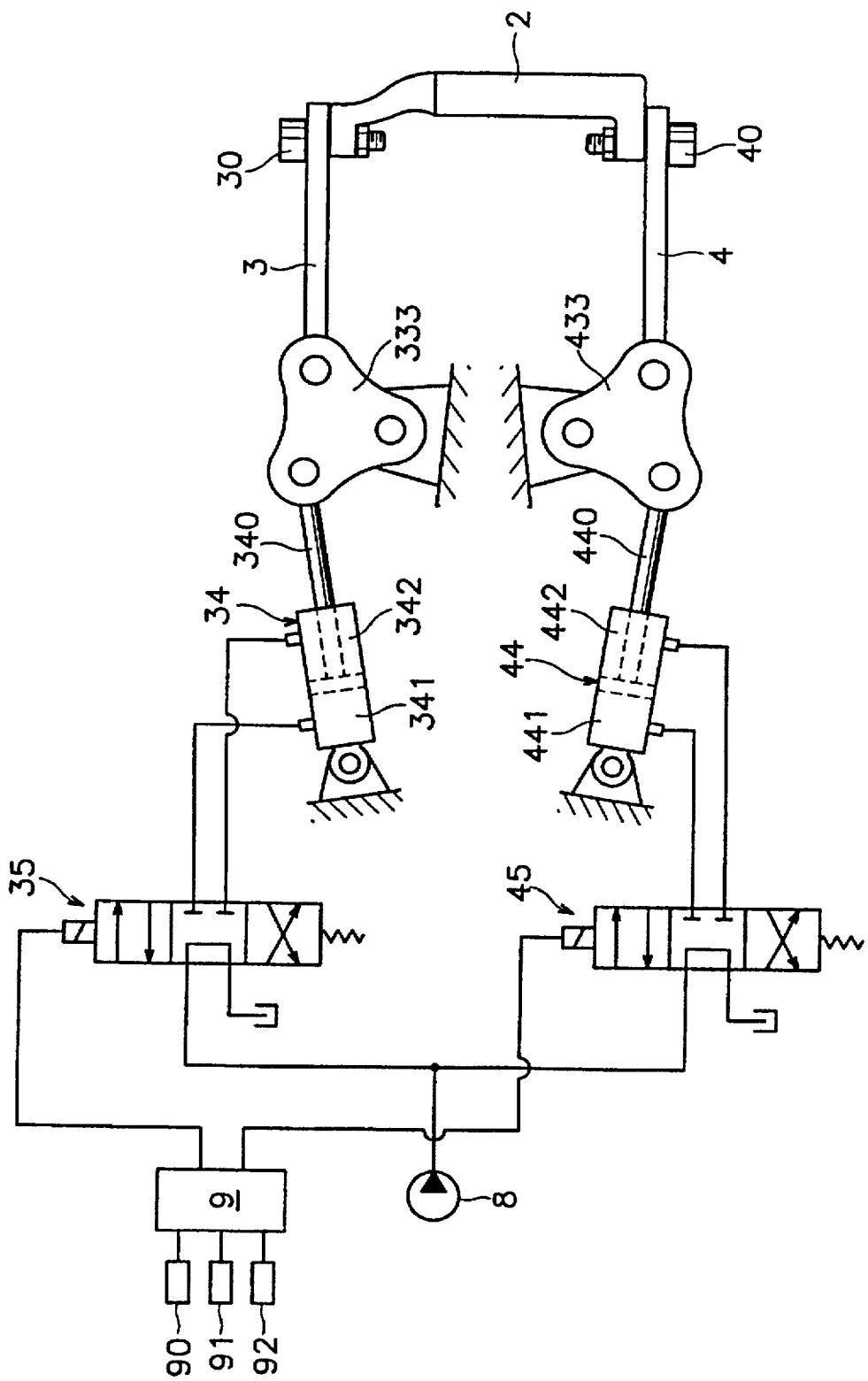
FIG. 2 is a schematic view of a camber regulating means applied to an embodiment of a suspension system according to the present invention.

With reference to FIG. 2, an electronic control unit 9 receives signals from sensors sensing the vehicle's driving state, like a vehicle speed sensor 90, a steering angle sensor 91, a side force sensor 92 and so on. The electronic control unit 9 compares these signals with predetermined data and decides them thereby controlling direction converting valves 35 and 45 for regulating the flowing direction of pressurized fluid from a hydraulic pump 8. Then, the pressurized fluid passed through the direction converting valve 35 and 45 is supplied with car body side hydraulic chambers 341 and 441 or wheel side hydraulic chambers 342 and 442 of the actuators 34 and 44 thereby pushing or pulling piston rods 340 and 440. The hinged plates 333 and 433, which are rotatably connected with the piston rods 340 and 440 and are hinged with the car body by one side, rotate respectively and push or pull the upper and lower control arms 3 and 4 rotatably connected with the wheel carrier 2 thereby regulating the camber and tread.

Figure 7:
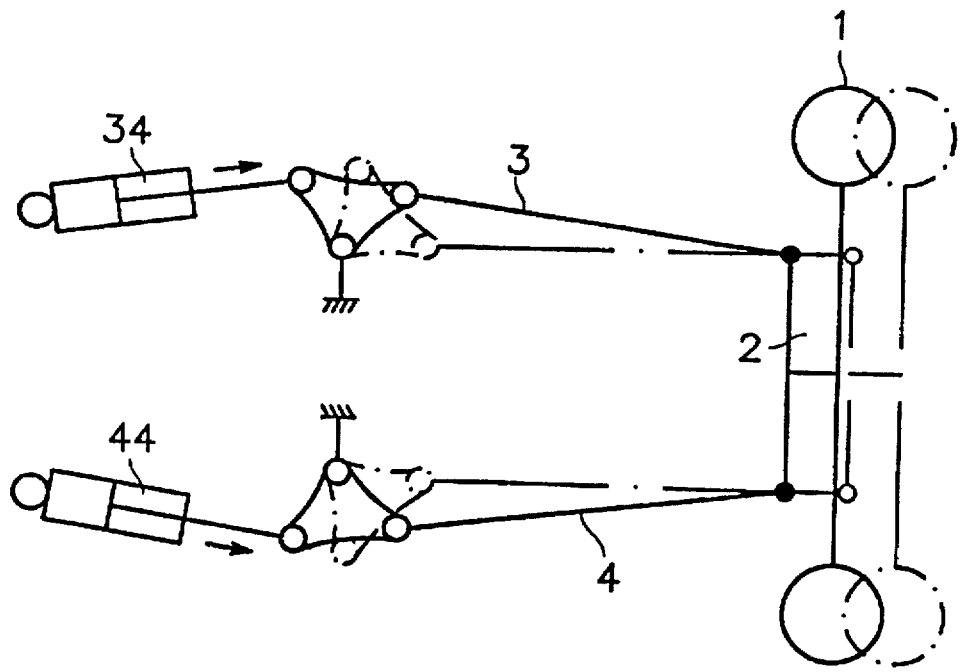
FIG. 7 shows an operation of a camber regulating means applied to an embodiment of a suspension system according to the present invention.

FIG. 7 shows an operation of the camber regulating means 5 of the embodiment, wherein the camber regulating means 5 regulates the wheel 1, indicated by imaginary lines, which are broken lines.

With reference to FIG. 3, the following is the description of the caster regulating means 6.

The electronic control unit rotates the direct current motor 62 clockwise or counterclockwise according to the driving state of the vehicle. Then the first fixed rod 430 rotates and moves upward and downward when viewed from the drawing so that the upper control arm 4 connected with the first fixed rod 430 also moves upward and downward. Accordingly, a caster angle is regulated thereby. When the vehicle speed is middle or high, as shown by a dotted line in the drawing, the lower control arm 4 moves downward so that the caster angle increases thereby improving the straight drive stability of the vehicle. On the contrary, when the vehicle speed is low, the lower control arm 4 moves upward so that the caster angle reduces thereby improving the steerability.

Figure 4A:
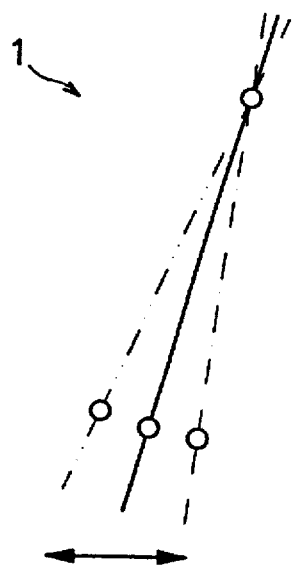
FIGS. 4A and FIG. 4B are side views showing an angular displacement of caster.
Figure 4B:
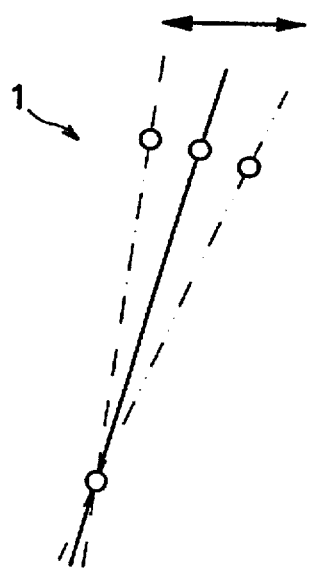

FIG. 4A is a side view showing an angular displacement of caster in case that the caster regulating means 6 is connected with the lower control arm 4, and FIG. 4B is a side view showing an angular displacement of caster in case that the caster regulating means 6 is connected with the upper control arm 3 (not disclosed), wherein a reference numeral "1" indicates a wheel.

With reference to FIG. 5, the following is the description of the toe regulating means 7.

Figure 8:
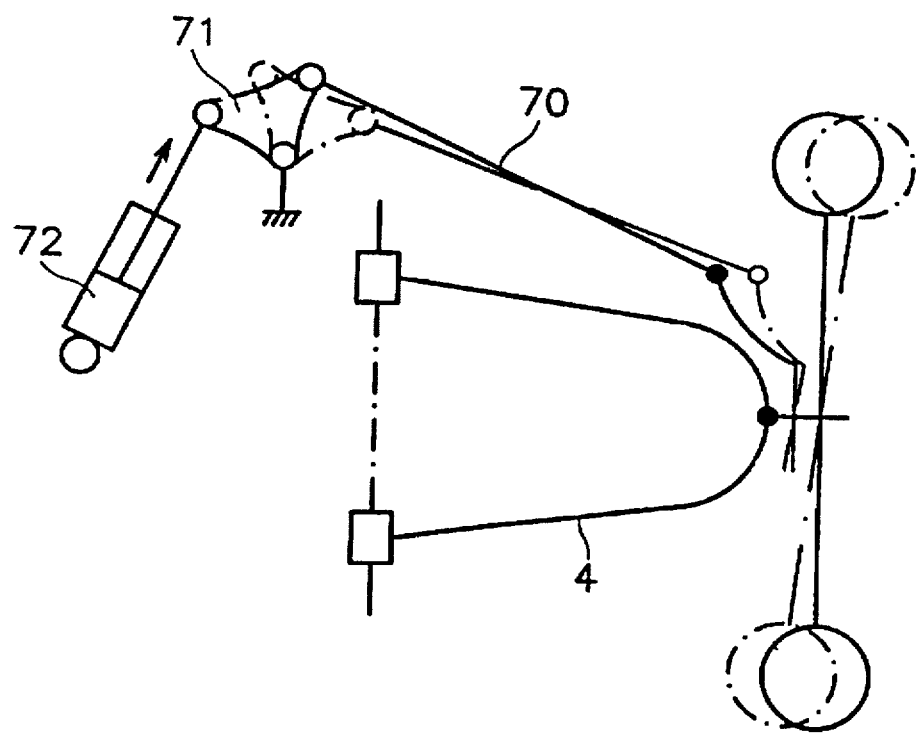
FIG. 8 shows an operation of a toe regulating means applied to an embodiment of a suspension system according to the present invention.

The electronic control unit makes the pressurized fluid to be supplied with the actuator 72 according to the driving state of the vehicle thereby pushing or pulling the piston rod 720. Then, the pivot member 71 pushes or pulls the connecting link 70 thereby regulating the toe. FIG. 8 shows an operation of the toe regulating means 7.

Figure 6:
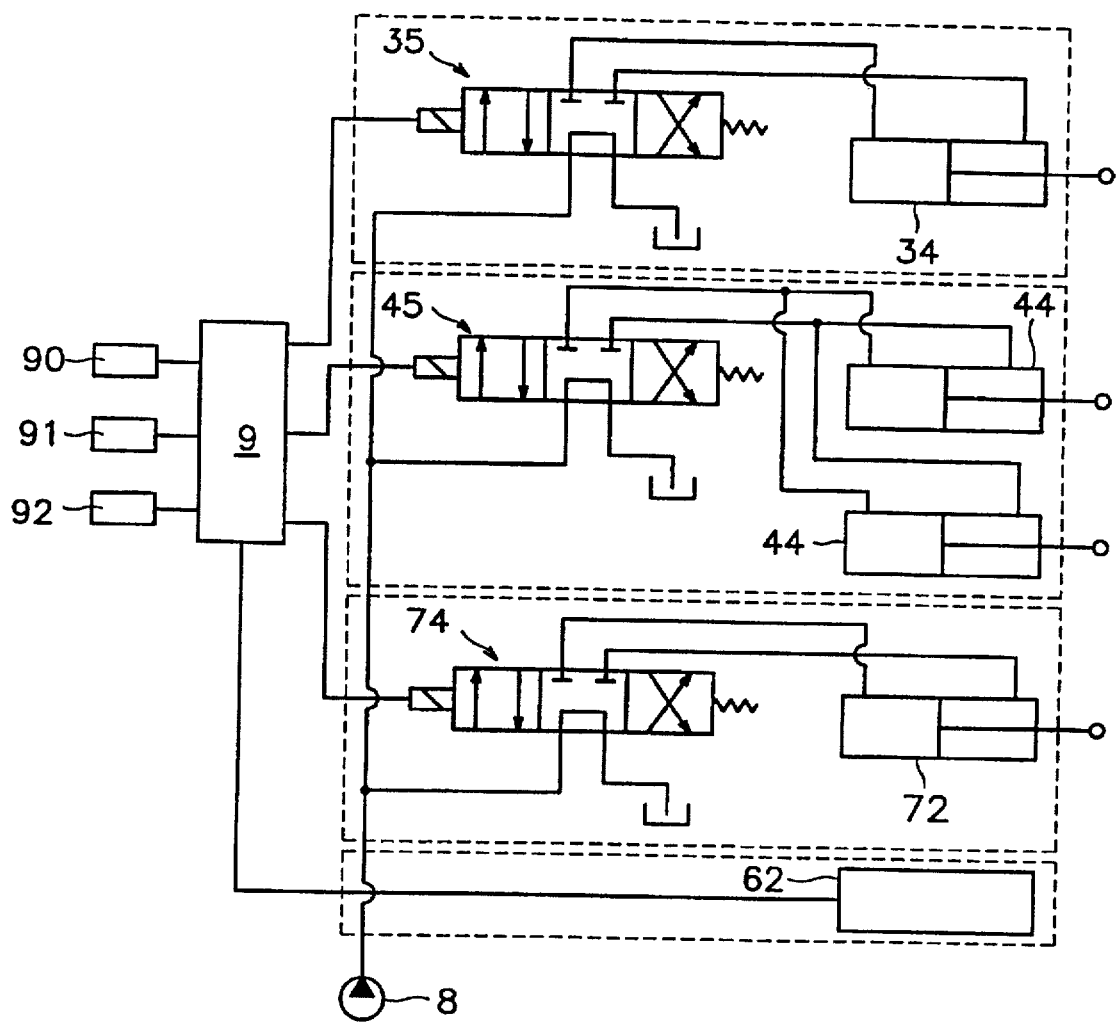
FIG. 6 is a hydraulic circuit diagram applied to an embodiment of a suspension system according to the present invention.

FIG. 6 is a hydraulic circuit diagram applied to an embodiment of a suspension system according to the present invention, which is described below.

When the electronic control unit 9 receives the signals from each of the sensors 90, 91 and 92, it compares the signals with the predetermined data and decides output signals thereby controlling each of the direction converting valves 35, 45 and 74, so that the actuators 34, 44 and 72 as well as the direct current motor 62 are properly operated.

According to the present invention, each regulating means 5, 6 and 7 controlled by the electronic control unit maintains an optimal state of the wheel alignment according to the diving state of the vehicle thereby improving ride quality and stability of the vehicle.

Figure 9:
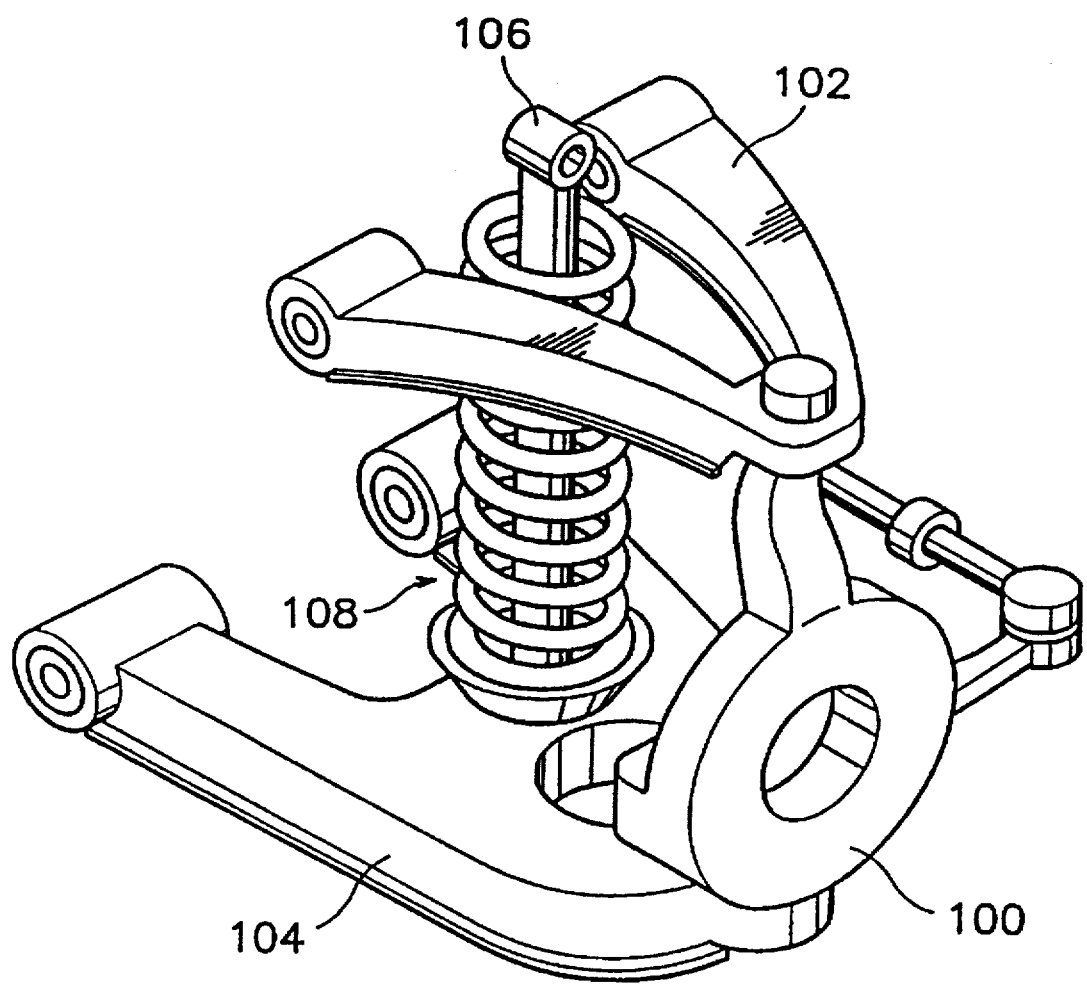
FIG. 9 is a schematic view of a suspension system of a prior art suspension system.

FIG. 9 illustrated prior art which has been described above in detail.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A vehicle suspension system for a steerable wheel comprising:

a wheel carrier rotatably supporting a wheel;

camber regulating means which is disposed on car body side ends of a control arm for pushing or pulling said control arm to a wheel side thereby regulating a camber angle;

caster regulating means which is disposed on the car body side ends of said control arm for moving said control arm to a front and a rear of the vehicle thereby regulating a caster angle;

toe regulating means which is connected with said wheel carrier thereby regulating a toe;

sensors sensing a driving state of the vehicle; and an electronic control unit for receiving signals from said sensors and controlling said camber regulating means, said caster regulating means and said toe regulating means.

2. The vehicle suspension system for the steerable wheel according to claim 1, wherein said camber regulating means includes:

a fixed rod rotatably connected with the car body side ends of said control arm;

a hinged plate which is rotatably connected with both side ends of the fixed rod and is hinged on the car body;

an actuator which is rotatably connected with the fixed rod and moves the fixed rod in the direction of car width; and a direction converting valve controlling the flowing direction of pressurized fluid supplied to the actuator.

3. The vehicle suspension system for the steerable wheel according to claim 1, wherein said caster regulating means includes:

a fixed rod rotatably connected with the car body side ends of said control arm;

mail screw portions provided on both ends of the fixed rod;

a worm gear fixed on one side end of the fixed rod;

a worm for rotating the worm gear;

a ball-screw which is fixed to the hinged plate, in which the male screw portion is inserted thereby making the fixed rod to rotate and move in the front and the rear direction of the vehicle; and driving means for rotating the worm.

4. The vehicle suspension system for the steerable wheel according to claim 1, wherein said toe regulating means includes:

a connecting link connected with said wheel carrier;

a pivot member which is hinged on the car body and is connected with the connecting link;

an actuator rotating the pivot member; and a direction converting valve controlling the flowing direction of pressurized fluid supplied to the actuator.

5. The vehicle suspension system for the steerable wheel according to claim 2, wherein the fixed rod includes a first fixed rod rotatably connected with the car body side ends of said control arm and a second fixed rod rotatably connected with the actuator.

* * * * *